Patented Aug. 4, 1936

2,049,576

UNITED STATES PATENT OFFICE 2,049,576

METHOD OF PREPARING MEAT SAUCE

Otto Ungnade, Mason, Mich., assignor to S. M. A. Corporation, Cleveland, Ohio, a corporation of Ohio No Drawing. Application June 9, 1933, Serial No. 675,109

5 Claims. (Cl. 99—14)

This invention relates to substances having the flavor of roasted meat and methods for the preparation of such substances. More particularly, the invention relates to the preparation of what may be called condiments, from the hydrolysis of proteins, and the products of such methods of hydrolysis.

The so-called meaty flavor and aroma of roast beef is known to be due to the chemical breakdown or hydrolysis of the meat protein during roasting, with the consequent formation of the amino acids which have previously existed in combination in the protein. Some of these individually contribute much to the meaty flavor and aroma of the food; this being especially true of glutamic acid and, in particular, of its acid sodium salt. However, the natural mixture of amino acids or certain of their saline derivatives, produced by acid hydrolysis of proteins and subsequent suitable neutralization, possesses most of the food value of the original protein and a fullness of flavor not realized from any one amino acid separately. Thus, it will be apparent that the full flavor and aroma of roasted meat is found in the mixture of amino acids resulting from the hydrolysis of such meat.

Since the amino acid composition of the various proteins found in many animal and vegetable materials is more or less alike, differing mainly in the relative percentages of each amino acid present and, also, since it has been found that these differences in the relative percentages of the amino acids present in the mixture resulting from acid hydrolysis have a negligible effect on the flavor and aroma of the product, it is possible to use a variety of different protein materials, and not meat alone, in obtaining a mixture of amino acids, any of which mixtures will have a meaty flavor and aroma. Examples of such natural protein-containing materials other than meat are wheat gluten, soy bean protein, casein, lactalbumin, etc. Further variation without any noticeable difference in flavor or aroma is possible in that certain of the amino acids may be absent or intentionally removed; this being particularly true of leucine or tyrosine which contribute little or nothing toward the flavor.

In the preparation of a tasteful mixture of amino acids from any of the above proteins or others which it may be found advantageous to use, any of various acids may be used to hydrolyze the protein, such as hydrochloric or sulphuric acid, but it is preferred to use hydrochloric acid because this yields ordinary salt in the subsequent step of neutralization with sodium hydroxide and such salt is not objectionable, as would be the case with the salts of other mineral acids, but actually useful, as it is needed in the final product to act as a preservative and would otherwise require to be added in order to increase the flavor. In the practice of the invention then, it is preferred to use hydrochloric acid as the hydrolytic agent and the casein of milk is selected from the above list as that yielding the most desirable product, although other proteins, either animal or vegetable, may be used.

The hydrolysis of proteins by the use of mineral acids is well known but, as ordinarily practiced, much time is required. It is possible to cut down the time by about one-half if the operation is carried on in a closed retort under a pressure of about twelve pounds and the advantages resulting from this reduction in the time of heating are very considerable from a commercial point of view since it permits a doubling of production without increase in hydrolyzing equipment. The cost of hydrolyzing equipment is a major item of expense, due to the fact that such equipment must be of the highest acid-resisting type and increased production per unit of apparatus results in an important reduction in the cost of the product. However, serious difficulties are encountered in carrying out this type of hydrolysis under pressure, the chief of which is the practical importance of securing tight joints which are resistant to the action of the hot vapors of hydrochloric acid. As a consequence, this pressure method is one of academic interest only and awaits the development of new types of gaskets or joints capable of standing up under the corrosive action of the hot vapors of hydrochloric acid to be practical.

It has also been attempted to speed up the hydrolysis of proteins by the use of catalysts in place of the use of high temperatures or high pressures or in conjunction therewith. The objection to the catalysts that have heretofore been proposed for this purpose is mainly due to their highly toxic nature, rendering the product of hydrolysis unfit for food without subsequent treatment. Thus, tin or a mixture of nitric acid and manganese dioxide has been used to promote the reaction but an additional step in the procedure was necessary in order to remove the toxic catalytic material from the protein hydrolysate before utilizing the product for food purposes.

From the foregoing it will be seen that a process of hydrolyzing proteins in which the reaction can be speeded up without the use of super-atmospheric pressures and without the use of a toxic catalyst is highly desirable. Accordingly, it is an object of the present invention to provide a process of hydrolyzing protein materials at an increased rate of speed under atmospheric pressure. Another object of the invention is to provide a process of hydrolyzing proteins by the use of a non-toxic catalyst. Still another object of the invention is to provide such a process in which a residue from other processes having to do with the treatment of organic materials is used as the catalyst with a beneficial effect on the final flavoring product. A further object of the invention is to provide a process in which hydrolysis is carried on at maximum temperatures attainable under atmospheric conditions. A still further object of the invention is the provision of a flavoring product for food having improved palatability and appearance. Other objects of the invention will in part be obvious and will in part appear hereinafter.

The present process is carried on, in line with these objects, by the use of a catalyst containing an acid of phosphorus or salts or other derivatives of these acids such as phosphoric or phosphorous acid, phosphates or phosphites. Any of the phosphates of calcium (mono-, di-, or tri-calcium phosphate) may be used, or materials rich in phosphates, such as the filter cake obtained as a by-product in the manufacture of milk sugar during the step in which lactalbumin is removed from whey by the addition of alkali. Phosphorous acid or its derivatives are, of course, oxidized to phosphoric acid or phosphates during the hydrolysis.

While the phosphates of calcium or phosphoric acid, added, or developed from phosphorous acid during the hydrolysis, reduce the time necessary for complete hydrolysis, it is found that the greatest economy of time and materials is obtained when the albuminous press cake described above is used. An analysis of such press cake may be the following:

| | Percent |
|---|---|
| Albumin | 40 |
| CaHPO₄ | 20 |
| Ca citrate | 15 |
| Silica | 20 |
| Lactose | 5 |

Of course, other materials of this type are also useful, as for example the press cake obtained in the manufacture of beet sugar and resulting from the operation known as defecation, this press cake being useful as a catalyst in proportion to its phosphorus content, which is low, but being subject to the objection that its calcium content is high, resulting in the production of a bitter taste in the hydrolysate. However, it may be said that, in general, suitable materials containing appreciable amounts of phosphates, such as calcium or magnesium phosphate, are effective at least in proportion to their phosphate content, the point being kept in mind that such materials must not introduce objectionable constituents into the final product. The use of the albuminous press cake described is also desirable for another reason which will be adverted to below.

In addition to the use of a non-toxic catalyst of the nature of a phosphate, as described above, the present invention also contemplates an improved method of maintaining the acid conditions of hydrolysis and the temperature thereof with resulting increase in the speed of the reaction and improvement in the final product. The hydrolysis of protein matter is usually carried out with the equivalent of three parts by weight of concentrated hydrochloric acid, specific gravity 1.19, to one part of protein and, if more dilute acid is used, an even larger proportion of acid to protein is employed. The use of such large quantities of acid is objectionable for the reason that neutralization of the acid upon completion of the hydrolysis results in the formation of relatively very large amounts of sodium chloride so that the proportion of amino acids to salt is small. This proportion can be increased if a large amount of the salt is separated by crystallization but such a procedure is relatively expensive since an impure salt results as a by-product, the value of which is not commensurate with the cost of the acid and alkali used up in its formation. In the present process, on the other hand, the proportion of acid to protein used is much reduced, in the neighborhood of 2 to 2.2 parts of acid to one part of protein being found sufficient without increasing the time necessary for hydrolysis.

The reaction is speeded up, even though a smaller proportion of acid is present, both by the use of a catalyst of the nature described, and by the use of acid of a rather definite percentage strength, namely, the strength of hydrochloric acid which has a minimum vapor tension, and, therefore, boils at a maximum temperature. This strength is approximately 20.2% of HCl and a hydrochloric acid-water mixture of this concentration has a constant boiling point of 110° C. at normal atmospheric pressure which is, moreover, the highest boiling point obtainable with mixtures of these two substances. Acid which is either weaker or stronger than this has a lower boiling point, that of stronger acid falling off rapidly and that of weaker acid more slowly. Use of stronger acid does not, therefore, result in a proportional increase in the speed of reaction, due to the temperature drop and use of weaker acid naturally results in a slower reaction speed. Thus, the use of acid of about 20% strength is most economical considering cost and time of reaction.

By using acid of the above concentration in the hydrolysis of protein material, it will be seen that the reaction can be initiated at the highest temperature possible under atmospheric conditions without the use of expensive pressure equipment. Such acid, of about 20.2% strength, and having a constant-boiling point, gives off vapors from the surface of the reaction mixture having approximately the same composition as the acid mixture itself. Consequently, the composition of boiling hydrochloric acid of this strength does not change, nor does its boiling point. During the hydrolysis of proteins, however, some of the hydrochloric acid is used up in the formation of hydrochlorides of amino acids resulting from hydrolysis and this gradually reduces the strength of the acid.

An example of the process as carried out in accordance with the above defined principles is the following, although it will be realized that such examples as may be given are for the purpose of description only and the invention is not limited thereto:

*Example No. 1*

| | Pounds |
|---|---|
| Dry casein | 250 |
| Concentrated hydrochloric acid, sp. gr. 1.19 | 300 |
| Water | 250 |

These are thoroughly mixed in an acid-proof kettle and heated to the boiling point, approximately 108–110° C., by means of steam; loss of acid vapors is prevented by the use of a reflux condenser so that any evaporated acid is condensed and automatically returned to the kettle. The proportions of acid and water used are such as to give a mixture having the minimum vapor tension, as described above, and therefore boiling at the maximum temperature. The mixture thus boils at the highest temperature obtainable with this acid in water and the reaction is accelerated at this highest temperature but without the aid of a catalyst. Under the conditions given, the time necessary for complete hydrolysis, as shown by a negative biuret test is about eighteen hours.

As illustrating the effect of the addition of a phosphate-containing catalyst to the reaction mixture, the following example is given in which the same conditions have been preserved as are outlined in Example No. 1, but in which a quantity of filter cake obtained as a by-product in the manufacture of milk sugar is used as a catalyst.

Example No. 2

| | Pounds |
|---|---|
| Dry casein | 200 |
| Filter cake | 50 |
| Concentrated hydrochloric acid, sp. gr. 1.19 | 300 |
| Water | 250 |

These materials are mixed and heated under the same conditions as in the foregoing example whereupon it is found that the time necessary for complete hydrolysis is reduced to approximately eight hours. The example may be varied by adding either phosphoric acid or one of the several calcium phosphates in amounts corresponding to the amount of each substance present in 50 lbs. of albuminous filter cake with the result that the time of hydrolysis is then reduced from eighteen hours to approximately ten hours. Of course, still further variation may be had by adding residues from various other industrial processes provided such residues show, upon analysis, the presence of phosphates and provided the equivalent of 50 lbs. of albuminous filter cake in such phosphates is used. The quantities given in the example may also be varied, as will be apparent.

As further illustrative of the catalytic effect of the addition of filter cake or its equivalents in phosphate material, even 10 lbs. of filter cake or the corresponding amount of phosphoric acid or its salts reduces the time for hydrolysis to about ten hours, as in the following example hydrolyzing this mixture:

Example No. 3

| | Pounds |
|---|---|
| Dry casein | 240 |
| Filter cake | 10 |
| Concentrated hydrochloric acid, sp. gr. 1.19 | 300 |
| Water | 250 |

While the effect of constant boiling hydrochloric acid boiling at the maximum temperature has been illustrated in Example No. 1, and the combined effect of acid of this strength and phosphatic catalytic material has been illustrated in Example No. 2, it is to be understood that either a definite concentration of acid may be used alone or the catalyst may be used with acid of other concentrations, but the best results will naturally be obtained by a combination of both features.

The subsequent treatment of the hydrolyzed mass after appropriate chemical tests have shown that the hydrolysis is complete, is as follows: The contents of the reaction kettle are cooled by means of cooling water flowing through coils or a steam jacket until the temperature has dropped to approximately 50° C. The mass is then subjected to vacuum distillation and the acid vapors are condensed by means of a suitable condenser and collected for use in a subsequent batch. When the concentration of the hydrolysate has been increased to the desired point, the vacuum distillation is interrupted and the concentrated hydrolysate is neutralized with sodium hydroxide until a sample diluted 1–10 with water is neutral to methyl red and acid to phenolphthalein, this neutralization for the quantities used requiring about 90 to 100 lbs. of the alkali. Following neutralization, the mixture is pumped through a filter press to remove humin and the filtrate is then pumped into a suitable covered tank where it is permitted to age for a period of time before use, after which it is again filtered, tested and packaged. The finished product has the following approximate analysis:

| | Per cent |
|---|---|
| Total solids | 45 –46 |
| Organic matter | 26 –28 |
| Amino acids | 24 –26 |
| Ash | 18 –19 |
| Sodium chloride | 16 –18 |
| Density | 1.22– 1.25 |

By the foregoing distillation step, the quantity of acid remaining in the hydrolysate is greatly reduced, usually to the extent of 30–35% of the total amount of HCl used, thus reducing the amount of acid which must be neutralized with sodium hydroxide and consequently reducing the amount of precipitated salt, the excess of which, over and above that needed in the final flavoring product, may be removed in some manner. The distillation may be carried to the point where only such acid is left in the hydrolysate as is required to produce sufficient sodium chloride for maximum keeping quality and for maximum flavoring effect. This procedure does away with the necessity of removing excess salt following neutralization, on the one hand, or of adding salt, on the other hand, where removal of the precipitated NaCl from the protein hydrolysate may have been carried too far.

The recovered acid, having a concentration of about 10–15% HCl, is reinforced by the addition of concentrated hydrochloric acid containing 38% HCl so as to yield a final mixture containing 20 to 21% HCl having a specific gravity of 1.12, this being the correct concentration, without further dilution, to give a constant boiling mixture of maximum boiling point for use in the hydrolysis of the next batch of casein or other material.

However, the hydrochloric acid used for the hydrolysis need not be recovered by distillation, if this is not desired. Good results may also be obtained by neutralizing the hydrolysate without first distilling off acid, the requisite quantity of sodium hydroxide being used for the purpose. Following neutralization as described, concentration is brought about by distilling off water in a vacuum pan until the organic matter reaches a concentration of about 26–28%, or even higher, without increasing the sodium chloride content above the permissible amount. It is found that the solubility of the sodium chloride decreases with higher concentrations faster than the solubility of the amino acids decreases, so that the amount of total solids present in the solution may be increased to the extent given without increasing the sodium chloride content. This was entirely an unexpected result since it could not have been foreseen that the sodium chloride would precipitate out more readily under continued concentration than would the organic constituents of the solution. The salt crystallizes out progressively during this evaporation and leaves about 16-18% of dissolved salt in the hydrolysate at the completion of the distillation. This is a permissible and desirable amount of salt for the development of full flavor in the meat sauce or condiment. The solid salt is removed by filtration or otherwise and is a valuable condiment itself since it carries with it a certain proportion of the flavoring materials of the mother liquor and hence may be used to advantage in place of ordinary salt in the flavoring of foods.

The most important property of flavoring substances imparting the flavor of meat, such as those described above, is the excellent flavor resembling that of roast beef which is attained by the presence of a natural or other suitable mixture of the amino acids of protein materials. However, another desirable and important property of such sauces or condiments is the possession of a sufficiently dark color so that when the concentrated substance is diluted with water to produce the equivalent in flavor and aroma of beef bouillon, the color, also, of the liquid will resemble that of ordinary beef bouillon. The attainment of sufficient color for this purpose, without the addition of vegetable or other coloring matter, has not, apparently, heretofore been achieved for when a quantity of the previously known meat flavoring substances has been added to a cup of hot water and seasoned, the cup of bouillon thus produced, say by the addition of two teaspoons of substance to a cup of hot water, has the flavor and aroma of beef bouillon but does not have sufficient depth of color to simulate the natural article. In the present process outlined above, a desirable dark color, as dark as that of ordinary beef bouillon, is obtained in accordance with the method set forth in Examples 2 and 3, the desirable dark color appearing in the product when albuminous filter press cake obtained in the manufacture of milk sugar from whey, is used as a catalyst in the hydrolysis of casein or other protein material. It is believed that the darker color of the hydrolysate resulting from the use of this filter cake depends upon the presence of lactalbumin in such cake. The same desirable dark coloration may also be obtained without the use of filter press cake if the casein which is to be hydrolyzed is prepared in a special way, namely, by coagulation from skimmed milk using first 0.2% of calcium chloride and then heating to approximately 90° C. In this manner, practically all of the milk albumin is coagulated along with the casein and the casein, so produced, contains a relatively high proportion of lactalbumin and also 5% or more of inorganic matter, which is largely calcium phosphate and acts catalytically in the hydrolysis similarly to the filter press cake.

The method herein described of hydrolyzing protein materials involves the use of a catalyst containing the radicals of acids of phosphorus including any of the phosphates and phosphites, which latter are oxidized to phosphates during the hydrolysis, and particularly the use as a catalyst of the residues of various processes in which organic materials are acted upon with the production of a filter or press cake or other residuum containing phosphorus acid radicals. An example of these has been given above as albuminous filter press cake from the manufacture of milk sugar. Others will suggest themselves to the chemist where analysis shows the presence of sufficient amounts of phosphates and the mass is otherwise suitable in the preparation of an edible product. The use of this phosphatic catalytic material speeds up the reaction so that a given unit of equipment will have a larger output with consequent reduced cost of production and the phosphate takes the place of toxic catalysts which would require thorough removal from the protein hydrolysate intended for human consumption. Furthermore, where albuminous filter press cake is used, a further resulting advantage is the darker color of the mixture of amino acids, simulating that of beef bouillon when placed in solution, such darker color being believed to depend upon the presence of the products of hydrolysis of lactalbumin.

The invention also includes the utilization of hydrochloric acid in minimum amount and of relatively dilute strength, thus reducing the cost of production. The strength of acid which it is preferred to use has been described as that technically known as "constant boiling", causing the reaction to proceed at a constant temperature and a constant acid concentration. This acid has a maximum boiling point under atmospheric pressure and permits the employment of the highest temperature possible under such pressure for the hydrolyzation with the consequence that the reaction speed is maintained at the highest possible rate without the employment of super-atmospheric pressures due to the fact that chemical reactions, as a general rule, proceed faster at higher temperatures. The use of a smaller quantity of hydrogen chloride in the hydrolysis also means that there is less of this substance to be neutralized or otherwise removed when the reaction is completed. Lesser acid present requires less sodium hydroxide for its neutralization and results in the production of a smaller quantity of salt, the excess of which must be removed.

The invention further includes the step of distilling off excess acid upon completion of the process to recover such acid for repeated use and also to cut down the quantity of alkali necessary to neutralize the residual acid. Such distillation may be controlled to leave just sufficient hydrogen chloride in the hydrolysate so that neutralization with sodium hydroxide produces the correct quantity of salt for flavor and preservative.

Where excess salt is removed from the mixture of amino acids constituting the meat sauce, which is the main product of the method, as where distillation of acid is not resorted to or where such distillation may not be carried out to the point described above, such excess salt containing some of the flavoring matter from the hydrolysate, may itself be used as a condiment.

The invention thus comprises the described improvements in the process of hydrolyzing proteins and also the improved method of neutralization as set forth.

What I claim is:

1. The method of hydrolyzing protein material in the presence of acid which comprises adding press cake containing phosphates thereto and heating the mass.

2. The method of accelerating the hydrolysis of protein material in the presence of acid which comprises adding a calcium phosphate thereto as a catalyst and heating the mass.

3. The method of hydrolyzing protein material which comprises adding hydrochloric acid thereto of about 20 to 21 per cent strength, adding albuminous filter cake containing phosphates to the protein material, and heating the mass to the boiling point.

4. The method of hydrolyzing protein material which comprises heating the protein with at least two parts of hydrochloric acid having a concentration of from about 20% to 21% in the presence of a substance containing phosphorus at atmospheric pressure for a sufficient length of time to hydrolyze the protein material to amino acids.

5. The method of hydrolyzing protein material which comprises heating the protein with at least two parts of hydrochloric acid having a concentration of from about 20% to 21% in the presence of a substance containing phosphorus at atmospheric pressure for a sufficient length of time to hydrolyze the protein material to amino acids, and maintaining the concentration of the hydrochloric acid substantially constant by condensing and returning the vapors to the hydrolyzing bath.

OTTO UNGNADE.